Feb. 9, 1937. R. G. CARLSON 2,069,995
CABLE OPERATED VALVE
Filed Feb. 25, 1933
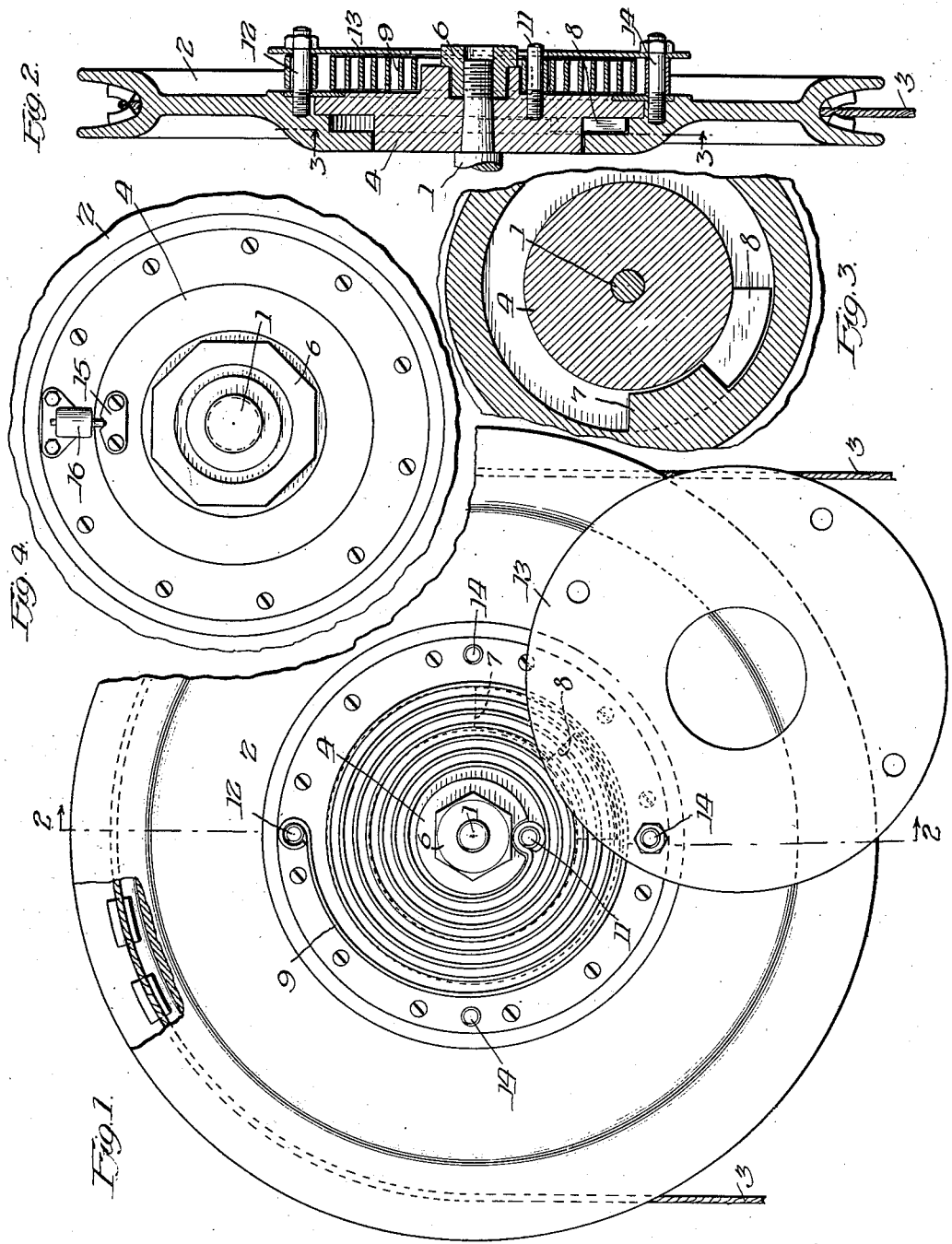
Inventor:
Ralph G. Carlson
By: Wilson, Dowell, McCanna & Lorch
Attys.
Witness:
R. B. Davison Patented Feb. 9, 1937

2,069,995

UNITED STATES PATENT OFFICE 2,069,995

CABLE OPERATED VALVE

Ralph G. Carlson, Chicago, Ill., assignor to Crane Co., Chicago, Ill., a corporation of Illinois Application February 25, 1933, Serial No. 658,505

8 Claims. (Cl. 185—41)

This invention relates to valve wheels and its purpose is to provide a valve wheel which will automatically assume a position to permit repeated blows to be applied to the valve stem without manually resetting the wheel for each blow.

In accordance with this invention the rim of the whool is secured to the valve stem with limited relative rotation between the rim of the wheel and the stem, and means are provided for rotating the rim relatively to the stem toward one limit of the relative movement or to an intermediate point between the limits of relative rotation.

A better understanding of this invention, the novel features of construction and the resultant advantages thereof may be had from the following description of the invention given in connection with the drawing illustrating the same and in which:

Fig. 1 is a plan view of a valve wheel applied to a valve stem hub nut, the spring cover being partly removed and a portion of the rim broken away to illustrate the interior construction, Fig. 2 is a transverse section taken approximately on line 2—2 of Fig. 1, Fig. 3 is a fragmentary section taken approximately on line 3—3 of Fig. 2, and Fig. 4 is a fragmentary plan view, with the cover and spring removed, of a slightly modified form.

Referring to the form of invention shown in Figs. 1 to 3, the wheel is illustrated as being cable operated and secured to a valve stem 1 projecting from a valve (not shown) of any standard construction and either a gate valve or globe valve, according to the service conditions to be met. In installations requiring a cable or chain operated valve and in which a hammer blow is desired the valve is usually a gate valve.

The wheel comprises a rim section 2, the perimeter of which is grooved in the usual manner to receive the chain or cable 3 and the center of which is offset and recessed to receive a hub 4, the latter being bored to receive the valve stem which is secured thereto by means of a nut 6. The rim is rotatable upon, i. e., relatively to the hub for a limited degree, approximately 260° in the illustrated form. The relative rotation is limited by an arcuate lug 7 projecting inwardly from and into the recess within the rim to be engaged by a similar arcuate lug 8 projecting outwardly from the hub 4. The foregoing construction provides for a hammer blow in that the rim may be rotated relatively to the hub until the lugs 7 and 8 contact in either direction of rotation.

A spring, in the illustrated form a clock spring 9, is placed under tension with its inner end secured to a pin 11 fastened to the hub and its outer end secured to a pin 12 fastened to the rim whereby the spring tends to rotate the rim in a counterclockwise direction about the hub, as viewed in Fig. 1, to recoil the rim relatively to the hub whereby a hammer blow may be given the hub in valve closing direction. A cover plate 13 is secured to the outer face of the rim to enclose the spring, being secured thereto by studs 14 and pin 12.

If the valve should stick in closing direction and it is desired to give a hammer blow thereto, it is only necessary to release the rim 2 or cable 3 to permit the spring to carry the rim of the wheel in a counterclockwise direction until it assumes the position shown in Fig. 3. The wheel or cable may then be given a jerk to impart a hammer blow in closing direction by reason of lug 7 engaging the opposite end of lug 8 from that shown in Fig. 3. If repeated blows are desired or necessary it is only necessary to repeatedly release the rim or cable 3 and repeat the blows inasmuch as the spring will always automatically recoil the rim relatively to the hub, eliminating the necessity of manually backing of the wheel.

Referring to the form of this invention illustrated in Fig. 4, the structure is the same except that a detent is provided whereby the spring recoils the wheel to an intermediate point rather than to either end limit of the possible relative rotation between the rim and hub. For this purpose notched plate 15 is attached to the hub to be engaged by a spring pressed plunger 16 attached to the rim. By this arrangement a hammer blow can be imparted to the hub in either opening or closing direction because the spring will recoil the rim to an intermediate position. This latter form of the invention is preferred where the valve has a tendency to stick in either open or closed direction, making it desirable to impart a hammer blow in either open or closed direction. Where the tendency is to stick in one direction only, the form illustrated in Figs 1 to 3 is preferable. The spring, of course, can be reversed from that shown in Figs. 1 to 3 where it is desired to impart a hammer blow in opening direction against the action of the spring.

From the foregoing description it will be apparent that the construction disclosed permits of repeated hammer blows being imparted to the valve stem without the necessity of manually reversing or recoiling the wheel in each instance. The specific construction illustrated, that is, the use of a spring of a clock spring type requires very little, if any, additional space, permits total enclosure of the spring, and provides for positive action. This type of spring is also long wearing and substantially trouble-proof.

It will be obvious to those skilled in the art that many variations from the particular form illustrated may be indulged in without departing from the spirit and scope of this invention as defined in the appended claims.

I claim:

1. A valve wheel comprising an annular wheel member adapted for operation in opposite directions by a cable, a hub adapted to be secured to a rotatable valve operating shaft and on which said member is rotatably mounted, said member having a driving lug, said hub having a driving lug in the path of revolution of said first mentioned lug, said first mentioned lug adapted to strike one side of said second mentioned lug when said member is rotated to one extreme position relatively to the hub and to strike the opposite side of said second mentioned lug when said member is rotated to its other extreme position relative to the hub, and a spiral spring connected with and reacting between said member and hub to hold said member normally at one extreme position relatively to said hub, said member adapted to be repeatedly cable-operated to the other extreme position and to be returned by the spring upon release of the cable, whereby to impart a succession of hammer blows in either operating direction to the valve-operating shaft on which the hub is mounted by successively pulling and releasing the proper run of the cable.

2. A valve wheel comprising an annular wheel member adapted for operation in opposite directions by a cable, a hub adapted to be secured to a rotatable valve operating shaft and on which said member is rotatably mounted, said member having a driving lug, said hub having a driving lug in the path of revolution of said first mentioned lug, said first mentioned lug adapted to strike one side of said second mentioned lug when said member is rotated to one extreme position relatively to the hub and to strike the opposite side of said second mentioned lug when said member is rotated to its other extreme position relative to the hub, and a spiral spring connected with and reacting between said member and hub to hold them normally in a relationship intermediate their extreme relative positions, said member adapted to be repeatedly cable-operated to either extreme position relative to the hub and spring-returned to said intermediate position by said spring upon release of the cable, whereby to cause a succession of hammer blows in either operative direction by successively pulling and releasing the cable.

3. A valve wheel comprising an annular wheel member adapted for operation in opposite directions by a cable, a hub adapted to be secured to a rotatable valve operating shaft and on which said member is rotatably mounted, said member having a driving lug, said hub having a driving lug in the path of revolution of said first mentioned lug, said member and hub having coacting detent means to hold them in a relationship intermediate their extreme relative positions, said detent means being releasable by a forced rotation of said member relative to said hub, a spiral spring connecting with and reacting between said member and hub tending to hold them in said intermediate position, said member adapted to be successively pulled to either extreme position by successive pulls of the cable for delivering a succession of hammer blows in either operative direction and to be successively returned by said spring to said intermediate position.

4. A cable-operated valve-operating device comprising, in combination, a valve-operating shaft, a driving wheel member coaxial with the shaft and connected therewith in a manner to provide a lost motion driving connection permitting a limited independent oscillation of said wheel member relative to the shaft, an operating cable engaging said wheel member and having opposite runs adapted to be manually grasped and pulled for operating the wheel member in opposite directions, and a spiral spring connected with and reacting between said shaft and wheel member for normally holding them in a given relationship, said wheel member and shaft having cooperative driving abutments which strike one against another at either limit of independent oscillation of the wheel member, the wheel member adapted to be reversely operated by the cable and spring for delivering a succession of preliminary hammer blows to the shaft in either operative direction by successively pulling and releasing the proper run of the cable.

5. A valve-operating device to be manually operated in opposite directions by a cable, the same comprising a member to be secured to a valve-operating shaft and to be driven for rotating said shaft, an associated coaxial driving wheel member to be engaged and driven by the cable, said wheel member connected with said shaft-operating member in a manner to provide a lost motion driving connection permitting a limited independent oscillation of said wheel member relative to said shaft-operating member, said members having cooperative driving abutments which strike one against another at either limit of independent oscillation of said wheel member, and a spiral spring connected with and reacting between said members normally holding the wheel member at one extreme position relative to the shaft-operating member, said wheel member being operable by the cable against the resistance of the spring to its other extreme position and returnable by the spring to its normal position upon release of the cable, whereby a succession of preliminary hammer blows can be imparted to the valve-operating shaft in either operative direction by successively pulling and releasing the proper run of the cable.

6. A valve-operating device to be manually operated in opposite directions by a cable, the same comprising a member to be secured to a valve-operating shaft and to be driven for rotating said shaft, an associated coaxial driving wheel member to be engaged and driven by the cable, said wheel member connected with said shaft-operating member in a manner to provide a lost motion driving connection permitting a limited independent oscillation of said wheel member relative to said shaft-operating member, said members having cooperative driving abutments which strike one against another at either limit of independent oscillation of said wheel member, and a spiral spring connected with and reacting between said members normally holding the wheel member in a position intermediate its extreme positions relative to the shaft-operating member, said wheel member being operable by the cable against the resistance of the spring to either of its extreme positions and returnable by the spring to normal position upon release of the cable, whereby a succession of preliminary hammer blows can be imparted to the valve-operating shaft in either operating direction by successively pulling and releasing the proper run of the cable.

7. A valve-operating device to be manually operated in opposite directions by a cable, the same comprising a member to be secured to a valve-operating shaft and to be driven for rotating said shaft, an associated coaxial driving wheel member to be engaged and driven by the cable, said wheel member connected with said shaft-operating member in a manner to provide a lost motion driving connection permitting a limited independent oscillation of said wheel member relative to said shaft-operating member through a greater angular distance than 180°, said members having cooperative driving abutments which strike one against another at either limit of independent oscillation of said wheel member, and a spiral spring connected with and reacting between said members normally holding the wheel member at one extreme position relative to the shaft-operating member, said wheel member being operable by the cable against the resistance of the spring to its other extreme position and returnable by the spring to its normal position upon release of the cable, whereby a succession of preliminary hammer blows can be imparted to the valve-operating shaft in either operative direction by successively pulling and releasing the proper run of the cable.

8. A valve-operating device to be manually operated in opposite directions by a cable, the same comprising a member to be secured to a valve-operating shaft and to be driven for rotating said shaft, an associated coaxial driving wheel member to be engaged and driven by the cable, said wheel member connected with said shaft-operating member in a manner to provide a lost motion driving connection permitting a limited independent oscillation of said wheel member relative to said shaft-operating member through an angular distance greater than 180°, said members having cooperative driving abutments which strike one against another at either limit of independent oscillation of said wheel member, and a spiral spring connected with and reacting between said members normally holding the wheel member in a position intermediate its extreme positions relative to the shaft-operating member, said wheel member being operable by the cable against the resistance of the spring to either of its extreme positions and returnable by the spring to normal position upon release of the cable, whereby a succession of preliminary hammer blows can be imparted to the valve-operating shaft in either operating direction by successively pulling and releasing the proper run of the cable.

RALPH G. CARLSON.